Feb. 19, 1963

P. E. APPLEBY 3,077,917

TIRE BUILDING MACHINE

Filed May 31, 1960

INVENTOR.
PAUL E. APPLEBY

BY

J.B.Holden
ATTORNEY

Feb. 19, 1963

P. E. APPLEBY 3,077,917

TIRE BUILDING MACHINE

Filed May 31, 1960

INVENTOR.
PAUL E. APPLEBY

BY

*J. B. Holden*

ATTORNEY

United States Patent Office 3,077,917
Patented Feb. 19, 1963

3,077,917
TIRE BUILDING MACHINE
Paul E. Appleby, Akron, Ohio, assignor to The Goodyear Tire & Rubber Company, Akron, Ohio, a corporation of Ohio
Filed May 31, 1960, Ser. No. 32,737
2 Claims. (Cl. 156—416)

This invention relates to an apparatus for building tires, and more particularly, to improvements to apparatus for building pneumatic tires by the flat band process. This application is a continuation-in-part of United States patent application S.N. 835,935, filed August 25, 1959.

In building or assembling pneumatic tires by the so-called flat band process, ply material consisting of parallel textile or metallic cords embedded in sheet rubber, is wrapped or placed about a substantially cylindrical outer surface of a drum or building form, and the circumferential marginal edges of the ply material are folded radially inward over the ends of the drum or building form. Circular bead rings are then placed against the in-turned edges of the ply material which are then folded about the bead rings to retain the latter in place.

The principal object of this invention is to provide an improved rubber covered radially expandable tire building drum.

Another object of the invention is to provide a tire building machine with an improved means for attaching a rubber cover to an expandable and axially adjustable tire building drum.

Other objects, use and advantages of the invention will become apparent to those skilled in the art from the following description and claims and from the drawings, in which:

Figure 1:
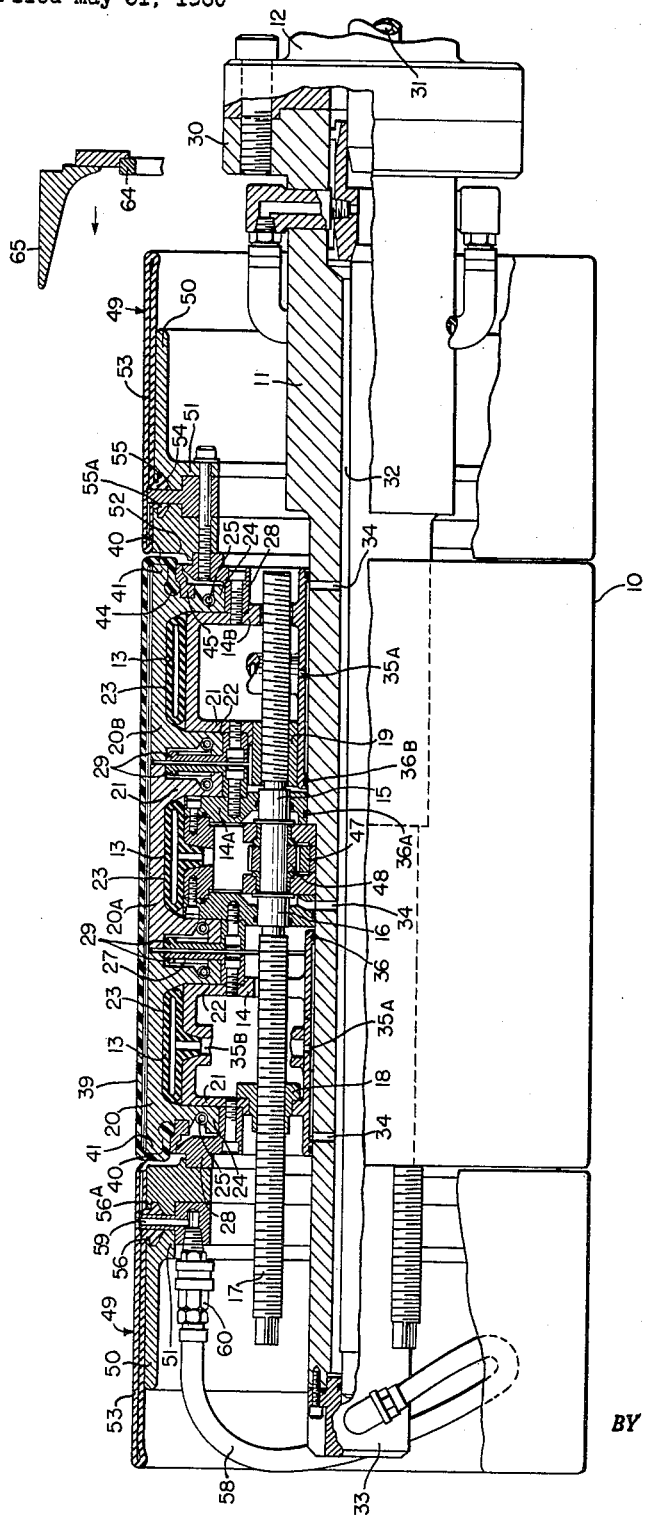
FIG. 1 is a longitudinal vertical sectional view of the tire building drum of this invention with parts broken away and parts shown in section.

Referring more particularly to the drawings in which like parts are referred to by the same numerals throughout the several views, a tire building drum 10 is mounted for rotation upon a rotatable shaft 11 secured to a drive spindle 12 which is rotated in either direction by the suitable power unit including a reversible motor and a brake. The drum 10 consists of a plurality of sections, each of which is radially expandable by means of an annular inflatable bladder 13, which are mounted respectively upon a spider 14, 14a or 14b, each of which is secured to the shaft 11. The center spider 14a is fixed to the shaft 11 and the spiders 14 and 14b are axially slidably mounted on the shaft. Spider 14a is provided with journals 15 and 16 which rotatably supports a screw threaded shaft 17, threaded to members 18 and 19 connected to the spider 14 and 14b. Rotation of the shaft 17 will cause the spiders 14 and 14b to move axially relative to the spider 14a. Each of the spiders 14 through 14b supports, respectively, a plurality of rigid elongated circumferentially narrow elements 20, 20a and 20b having depending radially inwardly extending legs 21 which engage the lateral surface 22 of the spiders 14, 14a and 14b. The elements 20, 20a and 20b are provided with a radially inner surface 23 which engages the radially outer surface of the annular bags 13. The depending legs 21 terminate in a flange 24 about which is resiliently held an annularly continuous helical spring 25 which urges the elements 20 radially inwardly. In the unexpanded position, the flange 24 of each of the elements 20 engages respectively a flange 26, shown in FIG. 2 on the inboard members 27 and outboard members 28 secured to each end of the spider 14 through 14b by means of suitable bolts, shown in FIG. 1. As shown in FIG. 2 the flanges 24 engage an annular flange 29 provided on the members 27 when the drum is in a radially expanded position.

Figure 2:
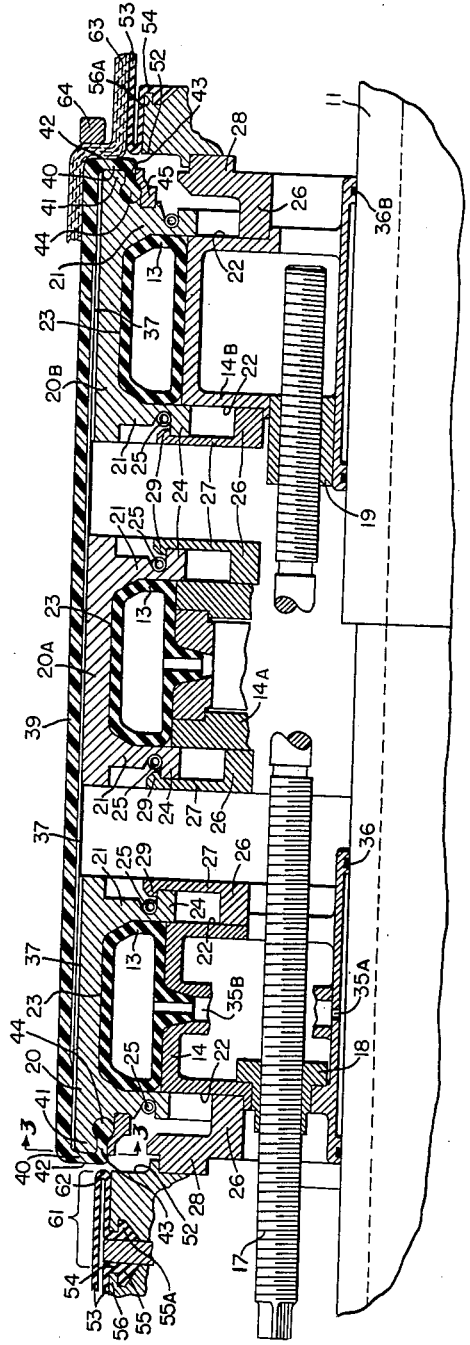
FIG. 2 is an enlarged partial longitudinal sectional view of the drum similar to FIG. 1 with parts broken away showing the drum in expanded position taken along another radial plane than FIG. 1.

As shown in FIG. 1, the shaft 11 is provided with a rotatable coupling 30 to which is fixed an air hose 31 which communicates with the hole 32 in the shaft 11 extending from the coupling 30 to the outter end 33 of the shaft. A plurality of radially extending holes 34 communicate with the hole 32 and with each of the annular bladders 13 through the holes 35a and 35b. The spiders 14 through 14b are provided with O-rings 36, 36a and 36b which insure that there is airtight communication between holes 34 and 35 and likewise permit the spiders 14 and 14b to be moved axially relative to the spider 14a. It is thus seen that as air pressure is admitted to the annular bladders 13 the bladders expand into toric shape as shown in FIG. 2 and each of the elements 20 are moved radially outwardly against the pressure of springs 25 until the flanges 24 engage the flanges 29 on the elements 27. In expanded position the elements 20 provide a substantially rigid cylindrical working surface. When the air pressure in the bladders 13 is released the elements 20 are returned to their radially inward position as shown in FIG. 1 by the springs 25.

Figure 3:
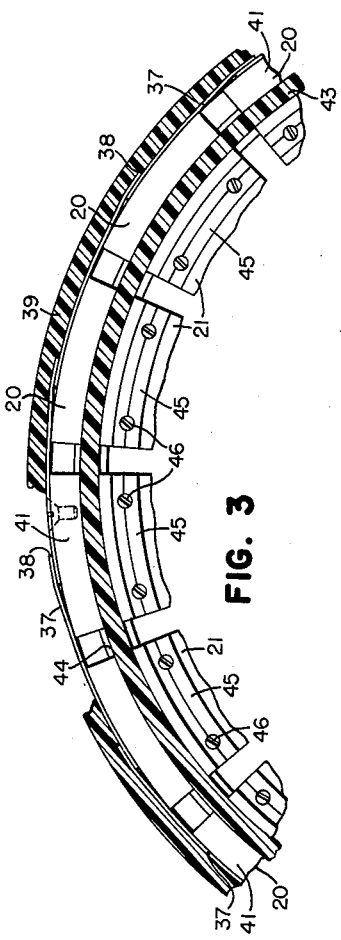
FIG. 3 is a partial cross sectional view taken along the lines 3—3 of FIG. 2.

As shown in FIG. 3 each of the elements 20 is provided with thin metal arcuate shaped cover plates 37 suitably secured thereto and which are coextensive with the complete length of the elements 20. The plates 37 extend circumferentially and beyond the elements 20 into overlapping engagement with adjacent plates and such overlapping relationship is maintained from the expanded to the unexpanded position of the drum. The plates 37 on the elements 20a extend axially therebeyond into an axial overlapping relationship with the plates 37 on elements 20 and 20b. Since the plates 37 overlap each other in all radial or axial expanded positions of the drum, it is seen that the plates 37 bridge the axially and/or the circumferentially extending gaps which exist between the elements 20 when the drum is expanded.

The plates 37 provide a radial and circumferentially continuous rigid work surface on the drum. In order to eliminate any bridging of the tire fabric across the edges 38 of the plates 37 a cylindrical, flexible, stretchable, elastomeric cover 39 completely encloses the plates 37. The cover 39 is provided at each end with radially inwardly extending portions 40 which extend around the shoulder 41 of the elements 20 and 20b. The outboard radially facing surface 42 of portion 40 extends radially inward and is coextensively formed with an axially extending portion 43 which terminates in an enlarged bead 44. As shown in FIG. 3, each of the elements 20 and 20b is provided with an arcuate member 45 secured thereto by suitable bolts 46 so that the axially extending portion 43 of the cover 39 and the bead 44 thereof are secured or clamped to each of the elements 20 and 20b. It is seen that as the drum is expanded from the position shown in FIG. 1 to the position shown in FIG. 2, the cover 39 is stretched solely in a circumferential direction because the cover 39 is connected solely to the members 20 and 20b by means of the arcuate member or clamps 45. Furthermore, the radially extending surface 42 presents an unobstructed surface against which the tire beads may be set, and the axially extending surface is advantageously secured to the drum for purposes which will be more fully explained hereinafter.

The drum can be adjusted axially so as to accommodate tires of different sizes by rotating the shaft 17 so as to move the spider 14 and 14b relative to the spider 14a. Each of the screw shafts 17 are spaced equidistant from each other in concentric relationship about the axis of the shaft 11 and are connected to each other by means of an annular ring gear 47 which engages a pinion gear 48 secured to each of the shafts 17 so that rotation of any one shaft 17 actuates all of the shafts 17 and in turn all of the shafts 17 exert a uniform and constant force on the spiders 14 and 14b to move them axially relative to the spider 14a.

As shown in FIG. 1 a ply turn-up device 49 is secured to each end of the drum which comprises a rigid cylindrical support 50 having a radially depending flange 51 which engages the outboard members 28 and is secured by a plurality of bolts directly to the member 28 of the drum. The surface 52 of support 50 extends radially and closely adjacent to the surface 42 of cover 39. An annular inflatable flexible rubber bag 53 is mounted on the member 50 and in uninflated position the bag 53 has an outer diameter substantially the same as the outer diameter of the drum 1 in unexpanded position. As shown in FIG. 1 the bag 53 is provided with an annular radially extending circumferentially continuous portion 54 which in cross-section is provided with flanges 55 and 55a engaged by the flange 56 and 56a of the member 50. A hose 31 is connected to the coupling 30 and communicates with a longitudinal opening in the shaft 11 extending from the coupling 30 to the end member 33, as shown in FIG. 1. A plurality of hoses 58 are connected to the member 33 and communicate with the orifice 59 on the bag 53 by means of a quick releasable coupling 60. The orifices 59 extend through the portion 54 and communicate with the interior of the bag 53.

The inboard portion 61 of the bag 53, that is the portion of the bag 53 which extends from the surface 62 axially to a position just beyond the orifice 59, is made of material which is more flexible than the outboard or remaining portion of the bag. The bag 53 is flat when uninflated and is inflatable into a toric shape. The ply endings 63 are turned around the bead ring 64 by means of the ply turn-up devices 49 by rolling the bladders 53 thereof upon themselves as shown and described in my copending patent application S.N. 835,935, filed August 25, 1959. Such movement or rolling of the bladders is accomplished by a combination restricting and pushing member 65 mounted respectively on a suitable carriage at each end of the drum.

As previously indicated, the envelope or cover 39 encloses the entire surface of the drum and as a result of this invention, as the drum is expanded from the position shown in FIG. 1 to the position shown in FIG. 2 in either radial or axial direction, the cover 39 is primarily stretched in a circumferential direction. Since the ends of the cover 39 are connected to the outboard ends on shoulder 41 of the members 20 and 20b by means of the axially extending portion 43, the portion 40 of the cover is not stretched radially during such radial or axial expansion of the drum. Then too, this invention provides a face 42 of the rubber cover 39 which in the unexpanded position of the drum is located parallel to and closely adjacent to the surface 52 of the support 50 so that as the drum is radially expanded, the portion 61 of the bag or bladder 49 is located closely adjacent and radially inwardly of the surface 42 against which the bead 64 is positioned. This permits the bag 49 to be properly inflated so that the portion 61 tensions the ply ending 63 in a direction axially of the drum.

While certain representative embodiments and details have been shown for the purpose of illustrating the invention, it will be apparent to those skilled in this art that various changes and modifications may be made therein without departing from the spirit or scope of the invention.

What is claimed is:

1. In a tire building machine, a radially expandable drum mounted on a shaft, said drum comprising a plurality of radially expandable sections coaxially arranged on said shaft, each section having a multiplicity of radially movable rigid elements, overlapping cover plates secured to said elements collectively defining a substantially cylindrical surface having end shoulders, means for simultaneously moving said elements from a radially inward to a radially outward position while maintaining said cylindrical surface, a resilient expandable elastomeric cover extending circumferentially around said cover plates and said shoulders, said resilient cover extending around said shoulder and radially inwardly for a distance at least equal to the extent at which said drum can be expanded, each of said radially extending portions having a coextensive portion extending axially toward the center of the drum, and means to secure said axially extending portion to each of said elements.

2. A tire building machine as claimed in claim 1 in which said means for securing said cover to said elements includes rigid arcuate members engaging an axially facing surface of said axially extending portions of said cover in clamping relationship with said elements.

References Cited in the file of this patent

UNITED STATES PATENTS

| | | |
|---|---|---|
| 1,949,752 | Maynard | Mar. 6, 1934 |
| 2,614,952 | Kraft | Oct. 21, 1952 |
| 2,715,932 | Frazier | Aug. 23, 1955 |
| 2,814,330 | Vanzo | Nov. 26, 1957 |

FOREIGN PATENTS

| | | |
|---|---|---|
| 280,640 | Great Britain | May 18, 1927 |
| 606,411 | Great Britain | Feb. 27, 1947 |
| 1,203,740 | France | Aug. 3, 1959 |